Figure 1:
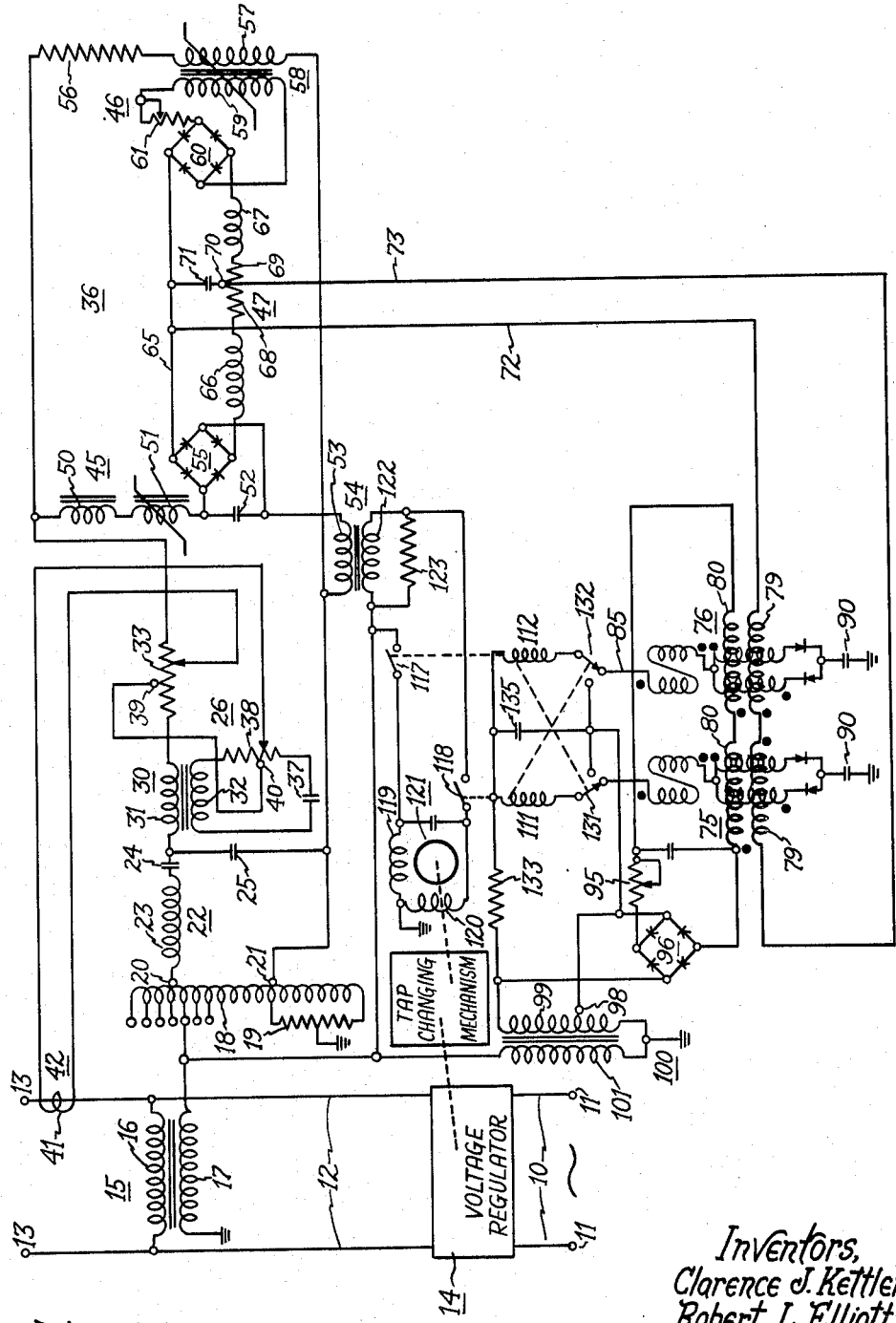

Feb. 1, 1966  C. J. KETTLER ET AL  3,233,168
CONTROL SYSTEM FOR VOLTAGE REGULATOR
Original Filed Oct. 1, 1958  4 Sheets-Sheet 3

Inventors,
Clarence J. Kettler,
Robert L. Elliott,
Charles W. Schoendube,
by Gilbert P. Tarleton
Their Attorney.

United States Patent Office 3,233,168
Patented Feb. 1, 1966

3,233,168
CONTROL SYSTEM FOR VOLTAGE REGULATOR
Clarence J. Kettler, Stockbridge, Mass., Robert L. Elliott, Anaheim, Calif., and Charles W. Schoendube, Lee, Mass., assignors to General Electric Company, a corporation of New York
Original application Oct. 1, 1958, Ser. No. 764,665, now Patent No. 3,054,943, dated Sept. 18, 1962. Divided and this application Apr. 6, 1962, Ser. No. 186,305
6 Claims. (Cl. 323—66)

This invention relates to means for regulating the voltage of electrical systems, and more in particular to an improved control system for controlling voltage regulating devices. This is a division of our co-pending Patent 3,054,943 granted September 18, 1962 on application, Serial Number 764,665, filed on October 1, 1958, titled Control System For Voltage Regulator, which is assigned to the same assignee as this invention.

In the past, various schemes have been employed to control the voltage of electrical power systems. Such schemes generally employ a voltage regulating device such as a tapped transformer or an induction voltage regulator, and means responsive to the voltage or current of the electrical system for initiating operation of a voltage regulating device to maintain a predetermined potential at a particular point in the power system. The present invention is primarily concerned with the control system for the voltage regulating device, and it will be obvious from the following disclosure that it may be employed in combination with various types of voltage regulating devices such as voltage regulating transformers that control the system voltage by means of tap windings, or induction voltage regulators that control the voltage by means of variable voltages induced in series connected windings.

In one type of previously employed control system, a device known as a voltage regulating relay or contact making voltmeter was employed to sense a variation in the system voltage from a predetermined value. In such systems, a voltage proportional to the system voltage was applied to the coil of the relay, and the relay was so designed that when the system voltage was above a predetermined value one set of contacts would close, and when the system voltage was below another predetermined value, another set of contacts would close. The relay contacts were connected to energize a motor in the correct direction to effect the desired system voltage change by the voltage regulating device. For example, the motor may be employed to change taps on a tapped transformer winding or it may rotate the rotor of an induction voltage regulator.

While satisfactory results have been achieved when employing voltage regulating relays from the standpoint of the desired voltage control, the necessary frequent operation of the contacts has resulted in difficulty in maintaining the contacts in continuous operation over extended periods of time, and frequent inspection and changing of the contacts was required. The contacts of the voltage regulating relays also had a tendency to chatter when the system voltage approached predetermined voltage range limits, and this increased the wear of the contacts in addition to increasing the danger that the contacts would stick and hence cause erroneous operation of the voltage regulating device. Although other contacts have been employed in such control circuits such as motor relay contacts operated by the voltage regulating relay contacts, the contacts of the motor control relays were not subject to the adverse conditions of the voltage regulating relay contacts, and hence the only component of the control systems that required frequent inspection and maintenance was the voltage regulating relay.

It is, therefore, an object of this invention to provide an improved control system for a voltage regulating system.

Another object is to provide a control system for a voltage regulating device adapted to control the voltage of an electrical power system, the control system having a minimum number of electrical contacts.

It is a further object of this invention to provide a control system for a voltage regulating device adapted to maintain the voltage of an electrical power system, the control system having only positively operated relay contacts.

A still further object of this invention is to provide a voltage regulating system that does not employ a voltage sensitive relay to sense the voltage or current conditions on an electrical power system.

Briefly stated, in accordance with one aspect of the invention, we provide a voltage regulating system for maintaining the voltage of an alternating current power system comprising means connected to the power system for providing an error voltage proportional to the variation in system voltage from a predetermined value. The means for providing the error voltage preferably comprises a ferroresonant sensing circuit including a serially connected linear inductor, saturable inductor, and capacitor, and a reference circuit, and circuit means for combining the output of the sensing circuit and reference circuit to produce an error voltage. Timer motor means are provided having at least one winding, and means are provided for energizing the winding comprising a serially connected source of alternating power and the main winding of a magnetic amplifier. Circuit means are provided connecting the control winding of the magnetic amplifier to the means providing the error voltage. Regulating means are provided for varying the power system voltage, and contact means operatively connected to the motor means are provided for selectively energizing the regulating means to vary the system voltage.

In the preferred embodiment of the invention, the timer motor means has first and second windings, connected serially with the main windings of first and second magnetic amplifiers respectively, the control windings of the magnetic amplifiers being connected to the error voltage producing the means. The timer motor means has a neutral position, means are provided to energize the motor means to rotate away from the neutral position comprising serially connected resistor means, serially connected resonant capacitor means, and a source of alternating power. Means are also provided for energizing the windings of the motor to operate the motor means to run toward the neutral position in the absence of an error signal comprising the serially connected resistor means, a tap means on the alternating source of power, and capacitor means selectively connected in parallel with one of the motor windings and in parallel resonance therewith.

While the specification concludes with claims particularly pointing out and distinctly claiming the subject matter which we regard as our invention, it is believed that the invention will be better understood from the following description taken in connection with the accompanying drawings.

Figure 2:
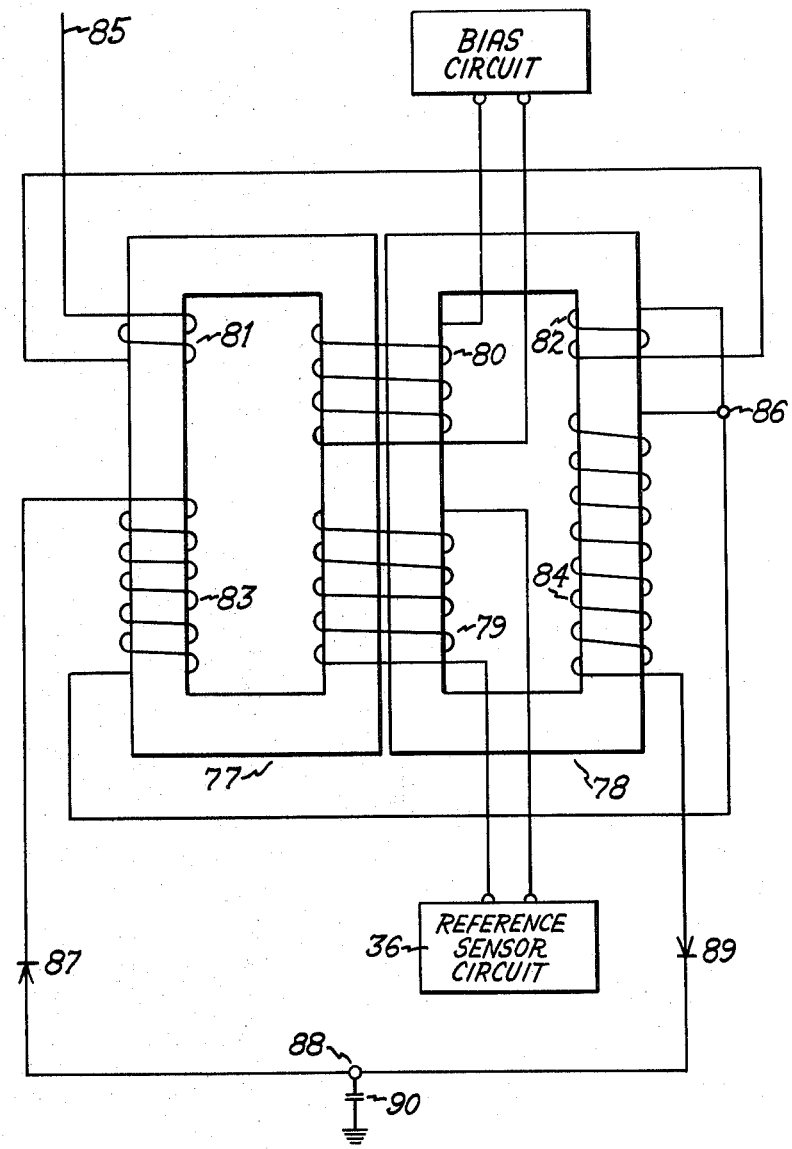
Figure 3:
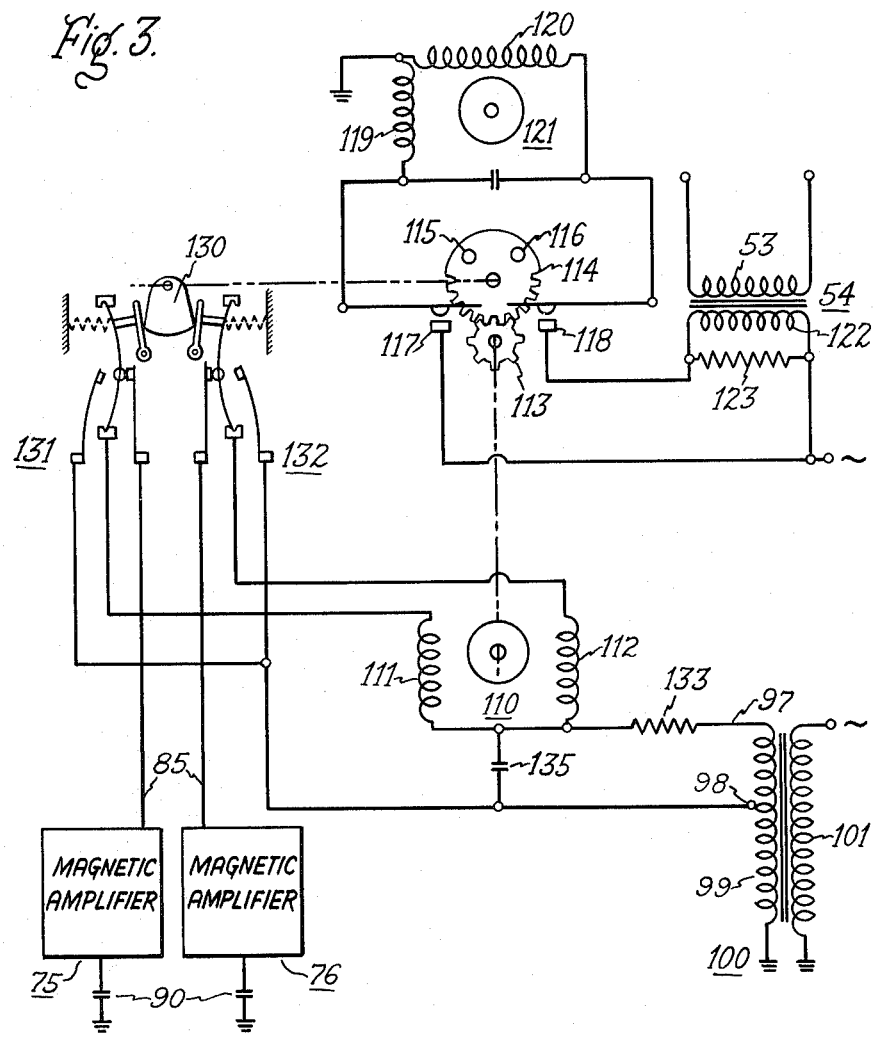
Figure 4:
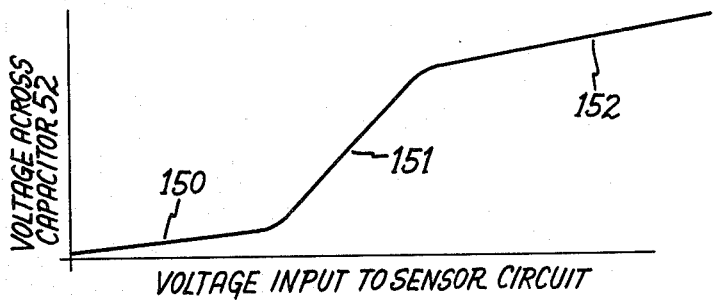
Figure 5:
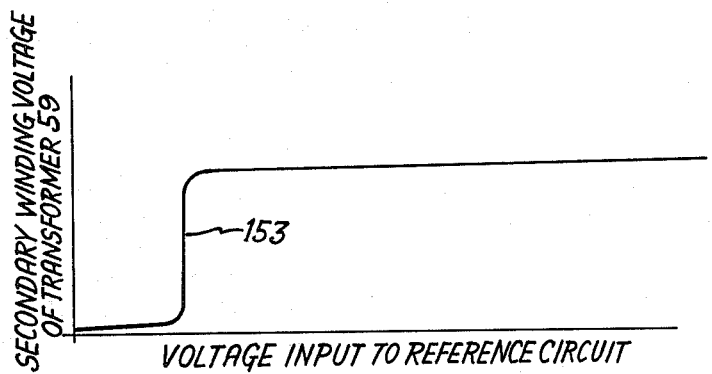

In the drawings:

FIG. 1 is a circuit diagram of a voltage regulating system according to the preferred embodiment of the invention, FIGURE 2 is a diagrammatic illustration of a magnetic amplifier such as may be employed in the system of FIG. 1, FIGURE 3 is a circuit diagram of a portion of the system of FIG. 1, and illustrating the time delay circuit of the system of FIG. 1, FIGURE 4 is a characteristic curve of the voltage output of the sensor circuit of the system of FIG. 1 as a function of the voltage input to the sensor circuit, and FIGURE 5 is a characteristic curve of the secondary winding voltage of transformer 59 of the system of FIG. 1 as a function of the voltage input to the reference circuit.

Referring now to the drawings, and more in particular to the circuit diagram of FIG. 1, therein is illustrated a pair of power lines 10 connected to electrical power source terminals 11 and a pair of power lines 12 connected to electrical load terminals 13. A voltage regulating device 14 is connected between the power lines 10 and the power lines 12 in order to regulate the voltage at the load terminals 13. The voltage regulating device may, for example, be a voltage regulating transformer having a tapped winding or an induction voltage regulator, although it shall be understood that this invention is not intended to be limited to any specific type of regulating device.

A potential transformer 15 has a primary winding 16 connected between the power lines 12, and a secondary winding 17 connected in series with a tapped autotransformer winding 18. A potentiometer 19 may be connected in parallel with a portion of the lower voltage end of the autotransformer, the arm of the potentiometer and one end of the secondary winding 17 of potential transformer 15 being connected to ground reference potential. The tapped autotransformer winding 18 and potentiometer 19 provide coarse and fine adjustments respectively for the autotransformer output voltage appearing between a high voltage tap 20 and low voltage tap 21 on the autotransformer. It will be understood, of course, that other devices and arrangements may be employed to obtain a variable output voltage proportional to the power line voltage.

The output of the autotransformer is connected to a frequency compensation and harmonic filter network 22 comprised of series connected reactor 23 and capacitor 24, and capacitor 25 which is connected in shunt with the output of the network 22. The reactor 23 and capacitor 24 are selected to have a resonant frequency approximating the power line frequency. The output of the frequency compensation network is connected to a line drop compensator denoted generally by the numeral 26.

The line drop compensator 26, which may be of the type disclosed in U.S. Letters Patent 2,751,511, which issued on an application of H. R. West and M. T. Reese, and is assigned to the assignee of the present invention, is comprised of a reactor 30 having a first winding 31 in inductive relation with a second winding 32. The first winding 31 of reactor 30 is serially connected with a potentiometer 33 between the output of the harmonic network 22 and the input of a reference-sensor circuit 36 (which will be disclosed in more detail in the subsequent paragraphs). The other winding 32 of reactor 30 is connected in series with a capacitor 37 and a potentiometer 38. In accordance with the disclosure of the previously mentioned patent of West and Reese, a tap 39 of the potentiometer 33 is connected to a tap 40 of the potentiometer 38, and the arms of the potentiometers 33 and 38 are connected to opposite ends of a secondary winding 41 of a current transformer 42 whose primary winding comprises one of the power lines 12. While the specific line drop compensator and frequency compensation networks above disclosed are employed in the preferred embodiment of the invention, it will be understood that other arrangements and devices may be employed without departing from the spirit or scope of the invention.

The reference-sensor circuit 36 is comprised of a sensor circuit designated generally by the numeral 45, a reference circuit designated generally by the numeral 46, and a T circuit designated generally by the numeral 47 interconnecting the reference and sensor circuits. The sensor circuit 45 is comprised of a series connected combination of a linear inductor 50, a saturable reactor 51, a capacitor 52, and the primary winding 53 of a transformer 54, the series combination being connected to the output of the line drop compensator, i.e., between one end of the potentiometer 33 of the line drop compensator and the tap 20 on the autotransformer 18. Alternatively, the linear and saturable reactors may be combined as a single reactor having a core that combines the characteristics of linear and saturable reactor cores. Opposite sides of the capacitor 52 are connected to diametrically opposite terminals of a bridge rectifier 55. The reference circuit 46 is comprised of a resistor 56 connected in series with the primary winding 57 of a saturable transformer 58, the series combination being connected in parallel with the sensor circuit. The secondary winding 59 of saturable transformer 58 is connected to opposite terminals of a bridge rectifier 60 by way of a variable resistor 61.

One remaining terminal of the bridge rectifier 55 is connected to one remaining terminal of bridge rectifier 60 by way of lead 65, and the other remaining terminals of the bridge rectifiers 55 and 60 are connected together by way of serially connected reactors 66 and 67 and resistors 68 and 69, so that reactor and one resistor appear between each bridge rectifier and a terminal 70. The resistors 68 and 69 provide thermal compensation for the circuit, as will be disclosed in more detail in the following paragraphs. A capacitor 71 is connected between the terminal 70 and the line 65, and the output leads 72 and 73 of the reference-sensor circuit are connected to the line 65 and the terminal 70 respectively. The bridge rectifiers 55 and 60 are connected so that their currents are in the same direction through lead 65 and resistors 68 and 69 and reactors 66 and 67.

A pair of identical magnetic amplifiers 75 and 76 are provided in the regulator control system of this invention, as illustrated in FIG. 1. Referring now to FIG. 2, each of the magnetic amplifiers 75 and 76 may be comprised of a pair of adjacent saturable magnetic cores 77 and 78 disposed so that an adjacent leg of each of the cores is surrounded by a common control winding 79 and a common bias winding 80. The cores 77 and 78 are also provided with separate feedback windings 81 and 82 respectively, and separate main windings 83 and 84 respectively. The feedback windings 81 and 82 are serially connected between a lead 85 and a junction 86 between one end of each of the main windings 83 and 84. The other end of the winding 83 is connected by way of a rectifier 87 to a point 88, and the other end of the winding 84 is connected by way of a rectifier 89 to the point 88. The point 88 is connected to ground reference by way of a capacitor 90.

As illustrated in FIG. 2, and as indicated by the dots on the magnetic amplifiers 75 and 76 in FIG. 1, the feedback windings 81 and 82 are positive feedback windings, and the rectifiers 87 and 89 have opposite terminals connected to the point 88.

Referring again to FIG. 1, the control windings 79 of the magnetic amplifiers 75 and 76 are serially connected between the leads 72 and 73, and hence, the output of the reference-sensor circuit. The bias windings 80 of the magnetic amplifiers 75 and 76 are also connected in series, and are connected by way of variable resistor 95 to the output of bridge rectifier 96. The input of the bridge rectifier 96 is connected between one end 97 and tap 98 of the secondary winding 99 of transformer 100. The primary winding 101 of the transformer 100 is connected in parallel with the secondary winding 17 of potential transformer 15. The other end of secondary winding 99 is connected to ground reference.

The time delay circuit, which may be more clearly understood with reference to FIG. 3, is comprised of a reversible timing motor 110 having a forward winding 111 and a reverse winding 112. The motor 110 is mechanically coupled to rotate a pinion 113, which in turn rotates a gear 114. The gear 114 has a pair of axially extending pins or projections 115 and 116 which, after predetermined angular displacement of the gear 114 are arranged to selectively operate a pair of switches 117 and 118 respectively depending upon the direction of rotation of the motor 110. The switches 117 and 118 selectively energize the raise and lower windings 119 and 120 respectively of a tap changing motor 121. For reasons to be more fully explained in the following paragraphs, the secondary winding 122 of transformer 54 is connected in parallel with a resistor 123, the parallel combination being connected in series with the contacts of switch 118.

The motor 110 is also mechanically coupled to rotate a cam 130. A pair of single pole double throw switches 131 and 132 are mounted to be selectively operated by the cam 130, dependent upon the direction of rotation of the motor 110. The normally closed contact (i.e., normally closed when the cam 130 is in the position illustrated in FIG. 3) of the switch 131 is connected to the main winding of magnetic amplifier 75, and the normally closed contact of the switch 132 is connected to the main winding of a magnetic amplifier 132. The normally open contacts of the switches 131 and 132 are connected together to the tap 98 of transformer 100. The center arms of switches 131 and 132 are connected respectively to one end of the motor windings 111 and 112, and the other ends of the windings 111 and 112 are connected together and by way of resistor 133 to the end 97 of secondary winding of transformer 101. A capacitor 135 is connected between the end 97 (by way of resistor 133) and tap 98 of winding 99.

Referring again to FIG. 1, the energization for the tap changing motor 121 is received (by way of switches 117 and 118) from the input voltage of the autotransformer 18. The tap changing motor 121 may be mechanically coupled to a tap changing mechanism 140, such as a spring driven electrical switching mechanism of the step type, and the mechanism 140 is coupled to the regulator 14 to effect voltage changes in the power lines 12.

*Operation*

When a voltage change occurs on the power lines 12, a proportional voltage change occurs at the output of the autotransformer. The frequency compensation network 22, which is series resonant at a frequency approximating the normal power circuit frequency, compensates for the effect of frequency change on the sensor-reference circuit, and also acts as a harmonic filter. The over-all frequency-output voltage characteristics of this network are substantially linear within a range of input frequencies about the normal power system frequency, and the network components are selected so that the circuit characteristics provide the necessary compensating effect to balance out the effect of frequency changes in the sensor circuit. Thus, the ratio of the output voltage ($E_o$) to the input voltage ($E_1$) of the frequency compensation network is approximately defined by the expression:

$$\frac{E_o}{E_1} = \frac{1}{1 + \frac{X_{C1} - X_L}{X_{C2}}}$$

where $X_{C1}$ is the reactance of the series capacitor 24, $X_L$ is the reactance of the series inductance 23, and $X_{C2}$ is the reactance of the shunt capacitor 25. From this expression it can be seen that the ratio is unity when the series circuit of capacitor 24 and inductance 23 is in resonance, the ratio is less than unity when the supply frequency is slightly less than the resonant frequency and greater than unity when the supply frequency is slightly greater than the resonant frequency. For example, if the normal supply frequency is 60 c.p.s. and the series circuit is resonant at this frequency, the frequency and harmonic compensation network will have a substantially linear frequency response with a positive slope from about 58 c.p.s. to about 62 c.p.s. to match the negative slope of the frequency response curve of the sensor-reference network. The line drop compensator circuit 26 modifies the voltage output of the autotransformer in response to power line current in order that a predetermined voltage level be maintained at a location distant from the regulator, according to common practice in voltage regulation systems.

The sensor circuit 45 is a ferroresonant circuit preferably comprised of a linear inductor 50, a saturable inductor 51, and a capacitor 52, with the output taken from the capacitor. While in the illustrated embodiment of the invention the linear inductor 50 and saturable inductor 51 are shown as separate components, it will be obvious to one skilled in the art that the same characteristics may be obtained by combining the inductors, for example on a magnetic core having a partial gap, and hence reference in this disclosure and the appended claims to series connected linear and saturable inductors includes arrangements in which the inductors are combined on a single core, since these two arrangements are equivalent. It will also be understood that the inductors must have sufficient resistance, either externally or internally to prevent an unstable behavior in the ferroresonant circuit. In this type of circuit, as disclosed in U.S. Letters Patent 1,921,786, C. G. Suits, assigned to the assignee of the present application, the characteristic curve of the voltage across the capacitor 52 as a function of the input voltage (see FIG. 4), has a first portion 150 in which the capacitor voltage increases gradually with increases in input voltage to the circuit, an intermediate portion 151 when the reactor 51 saturates in which the capacitor voltage increases linearly and rapidly with increases in voltage input, and a third portion 152 when the reactor 51 is saturated and the capacitor voltage again increases gradually with increases in input voltage. The sensor circuit serves the function of providing an output voltage proportional to changes in the voltage of the power system being controlled. It is, therefore, desirable that the output voltage of the sensor circuit be a substantially linear function of the input voltage, and also that the variation in output voltage with changes in input voltage be as large as possible.

Referring still to FIG. 4, the linear reactor 50 serves to reduce the slope of the intermediate linear portion 151 of the characteristic curve in order that this portion of the curve correspond to a large range of input voltages. This portion of the curve corresponds to the approach of saturation of saturable reactor 51, and substantially complete saturation of reactor 51 occurs at the knee of the curve between the portions 151 and 152. The capacitor 52 and linear inductor 50 are tuned so that they are in series resonance when the saturable reactor is substantially completely saturated, so that the voltage output across the capacitor 52 increases greatly as the saturable reactor approaches full saturation in the linear portion 151 of the curve. In other words, since the series circuit is approaching a resonant condition in the portion 151 of the curve, the variation in output voltage across the capacitor with respect to input voltage is greatly increased.

The sensor circuit is designed so that the effective values of input voltage will fall within the range of input voltages corresponding to the linear portion 151 of the characteristic curve. The output voltage across capacitor 52 will, therefore, be in the form of voltage pulses proportional in magnitude to variations about the mean established voltage level as determined by the setting of the autotransformer 18, and the averaged value of the pulses is thus a linear function of the power system voltage about the mean established level.

The transformer 53, whose primary winding is connected in series with the sensor circuit, provides a compensatory voltage for the motor 121, for reasons that will be more fully explained in the following paragraphs. The reference circuit, comprising saturable transformer 57 and resistor 56, has a characteristic curve 153, as illustrated in FIG. 5, in which, above the saturation voltage of the transformer, the secondary winding voltage remains substantially constant with changes in input voltage. It is in this region of the characteristic curve that the transformer 57 is adapted to operate in the system of the present invention.

The variable output of the sensor circuit and constant voltage of the reference circuit are combined in the T circuit 47 to produce an error signal between the leads 72 and 73. The circuit 47, aside from filtering the output of the sensor bridge rectifier 55 and reference bridge rectifier 60, and combining the outputs of the sensor and reference circuits to produce a differential output, also provides compensation for thermal variations in the sensor-reference circuit. The bridge rectifiers 55 and 60 are connected so that current flow from each of these sources flows in the same direction through the reactors 66 and 67 and the resistors 68 and 69 (i.e., output terminals of opposite polarity of the rectifiers are connected together). This produces a substantial current circulating in the two legs of the T and through the two bridge rectifiers. When the circuit is at balance, i.e., when the power line voltage is at the desired level, no voltage appears across the capacitor 71. When the sensor output voltage varies, however, in response to varying power line voltage, a direct current voltage will appear across the capacitor 71, the magnitude and polarity depending upon the magnitude of the power line voltage change and the direction the power line voltage varied with respect to the desired level.

The T circuit 47 lends itself to the combining of the reactors 66 and 67 and resistors 68 and 69 respectively, thereby employing the winding resistance in place of separate resistors, since copper windings in the T legs provide temperature compensation in the correct sense to overcome the thermal effects in the sensor-reference circuits (e.g., due to change in saturation level in the saturable transformer 58). It has been found, however, that overcompensation results if the T legs are comprised solely of copper windings. Therefore, it is preferred that the resistors 68 and 69 be employed in this circuit, and be made of a resistance material having a lower thermal coefficient of resistance than copper (e.g., Nichrome). In this manner, the proper balance between copper resistance in the reactors and resistance of the resistors 68 and 69 may be made to achieve a thermal variation in the resistance of the T circuit that will provide complete compensation for thermal variations in the sensor-reference circuit. As an example, in one arrangement it has been found that the compensation for thermal variation was achieved if the resistance of the resistors 68 and 69 was about five times the resistance of the reactors 66 and 67.

While, as has been previously stated, the output of the reference circuit is substantially constant, a certain variation of this output voltage does occur with changes in the input voltage. This variation is minimized if transformer 58 core is saturated for at least 90 electrical degrees of each half cycle of input voltage. The variation in the reference circuit output voltage is also further reduced when the reference circuit is connected to the T circuit, since with this connection the reference circuit receives energy from the sensor circuit. For example, in a reference circuit that had a 0.8 volt variation in output voltage with 40 volts change in input voltage, the output voltage variation was reduced to 0.1 volts when the reference circuit was connected to the T circuit as shown in FIG. 1.

An error voltage in the T circuit in response to line voltage variations results in the flow of current in the control windings 79 of the magnetic amplifiers 75 and 76. These series connected control windings are so polarized that current flow therethrough in one direction results in the "firing" (saturation) of one amplifier, while current flow in the other direction results in the firing of the other magnetic amplifier.

Referring now to FIG. 3, when, for example, the magnetic amplifier 75 fires in response to an error signal of one polarity, the amplifier presents only a very low impedance in the circuit comprised of timing motor winding 111, the secondary winding of transformer 100, one of the capacitors 90, and the normally closed contacts of cam operated switch 131. The winding 111 and the capacitor 90 in series with the winding are tuned to series resonance, so that reduction of the impedance of the magnetic amplifier 75 results in sufficient current flow in the motor winding to effect the operation of the motor. Consequently, the rotor of the motor 110 commences to turn in one direction. Shortly after the rotor of motor 110 starts to turn, the mechanical coupling between the motor and cam operated switch 132 results in the breaking of the connection between the motor winding 112 and connecting of the motor winding 112 between the end 97 and tap 98 of the secondary winding of transformer 100 in parallel with the capacitor 135. The capacitor 135 is selected to form a parallel resonant circuit with the winding 112. At this time there is insufficient voltage on the winding 112 to energize the motor to turn in the opposite direction, because of the large voltage drop in resistor 133 as a result of the correct flow through motor winding 111. After the motor has operated for a predetermined time in the direction controlled by the winding 111 (assuming for the sake of illustration that this direction is counterclockwise), the projection 115 engages the switch 117 to effect the energization of the tap changing motor 121. The motor 121 then proceeds to effect a voltage change in the voltage regulator 14 (FIG. 1), by any conventional means.

When the firing of the magnetic amplifier 75 ceases, either before or after switch 117 is actuated, the motor winding 111 becomes de-energized, and sufficient voltage appears across the motor winding 112 to effect the rotation of the timing motor to its original position (as illustrated in FIG. 3). The firing of magnetic amplifier 76 in response to an error signal of the opposite polarity, of course, results in similar action in the timing circuit, with the exception that in this case the motor 110 is actuated to turn in the opposite direction, switches 131 and 118 are actuated, and the motor 121 effects a voltage change in the regulator 14 in the opposite direction.

The timing circuit operates in the same manner as the timing circuit disclosed in U.S. Letters Patent No. 2,779,899, which issued on an application of T. C. Lennox and is assigned to the assignee of the present invention. In the present arrangement, however, it is preferred that a separate capacitor 90, which forms a series resonant circuit with each of the motor windings 111 and 112, be provided in series with each of the magnetic amplifiers 75 and 76, in order to prevent interaction between the two magnetic amplifiers.

In the system of FIG. 1, the power for the tap changing motor is derived from the same source as the sensor circuit. While this provides a convenient arrangement, it may result in variations in the voltage applied to the sensor circuit when the motor 121 is operating. In order to compensate for the overloading of the source of supply, it may be desirable to connect the primary winding 122 of a transformer 54 in series with the supply circuit of the motor 121. The secondary winding 53 of transformer 54 is then connected in series with the sensor circuit to provide the necessary compensatory voltage. The resistor 123 in parallel with the primary winding 122 is selected so that the desired secondary winding voltage is provided. While in the system of FIG. 1 the sensor circuit is only compensated for current flow in one of the motor windings, it is obvious that, if necessary, similar compensation may be provided in the other motor winding circuit.

Since the control system is balanced (i.e., no error signal to the magnetic amplifiers) when the output voltage of the sensor circuit is equal to the output voltage of the reference circuit, the value or level of the voltage maintained on the electrical power system may be varied by changing the proportion of the system voltage that appears at the sensor circuit. In the system of FIG. 1, the voltage level may thus be adjusted either in large increments by changing taps on the autotransformer 18, or in fine increments by adjusting the potentiometer 19. The band (i.e., the range of voltages about the voltage level that may occur without initiation of an operation of the voltage regulating device) may be adjusted by variation of the firing point of the magnetic amplifiers, such as by adjustment of the potentiometer 95 in the magnetic amplifier bias circuit.

It will be understood, of course, that, while the form of the invention herein shown and described constitutes the preferred embodiment of the invention, it is not intended herein to illustrate all of the possible equivalent forms or ramifications thereof. It will also be understood that the words employed are words of description rather than of limitation, and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. A static voltage error sensing system comprising a source of alternating potential, a sensing circuit comprising a serially connected linear inductor, saturable inductor, and a capacitor, a voltage reference circuit comprising a saturable transformer, said sensing circuit and the primary winding of said transformer being connected to said source of potential, means providing a first direct current proportional to the voltage across said capacitor, means providing a second direct current proportional to the secondary winding voltage of said transformer, and means combining said first and second direct currents to provide an error signal proportional to variation in the voltage of said source from a predetermined value.

2. A static voltage error sensing system comprising a source of alternating potential, a sensing circuit comprising a serially connected linear inductor, a saturable inductor, and a capaictor, said sensing circuit being series resonant when said saturable inductor is saturated, a voltage reference circuit providing a constant direct current, said sensing circuit being connected to said source of potential, means providing a direct current proportional to the voltage across said capacitor, and means combining said proportional direct current and constant direct current to provide an error signal proportional to variation in the voltage of said source from a predetermined value.

3. A static voltage error sensing system comprising a source of alternating potential, a sensing circuit comprising a serially connected linear inductor, a saturable inductor, and a capacitor, said sensing circuit being series resonant when said saturable inductor is saturated, said sensing circuit being connected to said source of potential, a reference circuit providing a constant direct current, means providing a direct current proportional to the voltage across said capacitor, and circuit means interconnecting said reference circuit and said means providing said proportional direct current, said interconnecting means comprising a pair of leads connected between said reference circuit and said means providing said proportional direct current so that the two direct currents flow in the same directions through said leads, a pair of inductive impedance means connected in series with one of said leads, and output terminal means at the junction of said impedance means and the other of said leads.

4. A static voltage error sensing system comprising a source of alternating potential, a ferroresonant sensing circuit comprising serially connected linear inductor means, saturable inductor means, and capacitor means, said circuit being in series resonance when said saturable inductor is saturated, reference circuit means comprising a saturable transformer, the primary winding of said saturable transformer and said sensing circuit being connected to said source of alternating potential, first bridge rectifier means having two opposite junctions connected across said capacitor, second bridge rectifier means having two opposite junctions connected across the secondary winding of said saturable transformer, lead means connecting together one remaining terminal of each of said rectifiers so that the current of each rectifier flows in the same direction through said lead, first and second inductance impedance means serially connected between the other remaining terminals of said rectifiers, an output circuit means between said lead means and the junction of said first and second impedance means.

5. The error sensing system of claim 4 in which said inductive impedance means are comprised of serially connected copper wound inductor means and resistance means from a conductor having a lower thermal coefficient of resistance than copper, the resistances of said resistance and reactor being proportioned to compensate for thermal variations in said system.

6. The error sensing system of claim 4 in which said sensing circuit and primary winding of said saturable transformer are connected to said source of alternating potential by way of a series resonant circuit resonating at a frequency substantially the same as the frequency of said source and a shunt capacitor means to compensate for frequency variation in the output in said system.

References Cited by the Examiner

UNITED STATES PATENTS

| | | | |
|---|---|---|---|
| 2,653,254 | 9/1953 | Spitzer et al. | 323—76 X |
| 2,763,827 | 9/1956 | Evans | 323—61 X |

FOREIGN PATENTS

| | | |
|---|---|---|
| 701,197 | 1/1941 | Germany. |
| 646,010 | 6/1937 | Germany. |

MILTON O. HIRSHFIELD, *Primary Examiner.*

LLOYD McCOLLUM, *Examiner.*